United States Patent [19]

Wood

[11] 4,058,021
[45] Nov. 15, 1977

[54] LEAF CHAIN AND TO DRIVING ARRANGEMENTS EMPLOYING SAME

[75] Inventor: Peter Wood, Cheadle, England

[73] Assignee: Renold Limited, Manchester, England

[21] Appl. No.: 731,334

[22] Filed: Oct. 12, 1976

Related U.S. Application Data

[63] Continuation of Ser. No. 551,618, Feb. 21, 1975, abandoned.

[30] Foreign Application Priority Data

Feb. 28, 1974 United Kingdom ............... 9221/74

[51] Int. Cl.² ..................... F16H 7/06; F16G 13/00; F16G 13/18
[52] U.S. Cl. ................................. 74/229; 74/243 R; 74/245 R
[58] Field of Search .............. 74/229, 245 R, 245 S, 74/245 LD, 250 R, 250 S, 243 R

[56] References Cited

U.S. PATENT DOCUMENTS

| | | | |
|---|---|---|---|
| 1,141,869 | 6/1915 | Douglas | 74/250 R |
| 1,270,460 | 6/1918 | Taylor | 74/245 S |
| 1,329,034 | 1/1920 | Binder | 74/243 R |
| 2,769,346 | 11/1956 | Flocke | 74/245 R |
| 3,118,317 | 11/1964 | Michalik | 74/250 R |

*Primary Examiner*—Samuel Scott
*Assistant Examiner*—Allan R. Burke
*Attorney, Agent, or Firm*—Flynn & Frishauf

[57] ABSTRACT

A limited torque, positive drive transmitting arrangement employs a leaf chain and a fluted pulley which co-operates therewith. The positive drive is transmitted via engagement of the leaf chain link edges with the specially formed pulley flutes, and the leaf chain is modified to ensure that the consequential loading of the link edges and any resulting damage thereto is prevented from interfering with the proper articulation of the chain in passing round the pulley.

25 Claims, 5 Drawing Figures

LEAF CHAIN AND TO DRIVING ARRANGEMENTS EMPLOYING SAME

This is a continuation, of application Ser. No. 551,618, filed Feb. 21, 1975 now abandoned.

A leaf chain consisting of interlacing links interconnected by bearing pins is well known. A leaf chain is to be distinguished from a roller chain which is normally used with a sprocket wheel to transmit a positive drive. A leaf chain may be used in conjunction with plain pulleys but these have served simply to guide the chain.

The present invention provides a limited torque, positive drive transmitting arrangement comprising a tensioned leaf chain comprising interlacing links interconnected by bearing pins passing over or around a drum or pulley having a fluted periphery which interfits with the edges of the leaf chain links, the edges of each adjacent pair of the leaf chain links being maintained in spaced apart relationship by spacing means disposed within the peripheral edges of the links.

The spacing maintained between the peripheral edges of each adjacent pair of the leaf chain links ensures that when the links come under load, with the link edges in engagement with the fluted periphery of the drum or pulley, any damage to the link edges, for example in the form of spreading or burrs, cannot interfere with the proper articulation of the links in passing round the fluted drum or pulley thereby interrupting the positive drive.

At the same time, torque transmission between the chain and the fluted drum or pulley is limited, since slipping will occur if the torque rises beyond a predetermined amount, depending upon the tension in the leaf chain, and this is a useful feature.

Preferably, the leaf chain links are all of identical figure-of-eight configuration and the flutes of the fluted periphery of the drum or pulley extend straight and parallel with its rotational axis, the flutes being all of identical, uniform, cross-sectional shape and uniformly spaced, the depth, shape and spacing of the flutes being such that the peripheral edge of each of the links of the leaf chain in engagement with the drum or pulley engages flute surface portions of adjacent flutes in the drum or pulley at corresponding sides thereof.

Conveniently, the spacing means is washers on the bearing pins, and preferably spacing washers are provided, for each pin, one between each pair of adjacent links articulated by the pin.

Alternatively however, the links themselves or some of them may be formed with bulges or angular lips constituting said spacing means or the links, or some of them may simply be chamfered at their edges.

The present invention also comprehends per se the leaf chain comprising the spacing means.

BRIEF DESCRIPTION OF THE DRAWINGS

The above and other features of the present invention will become clear from a consideration of the following description of specific embodiments of the present invention given by way of example and not by way of limitation, with reference to the accompanying drawings in which.

DETAILED DESCRIPTION

Figure 1:
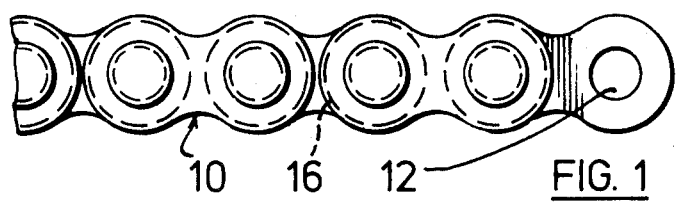
FIGS. 1 and 2 are respectively an elevation and a plan view of a portion of a leaf chain according to the present invention and illustrating different means of spacing its adjacent links.
Figure 2:
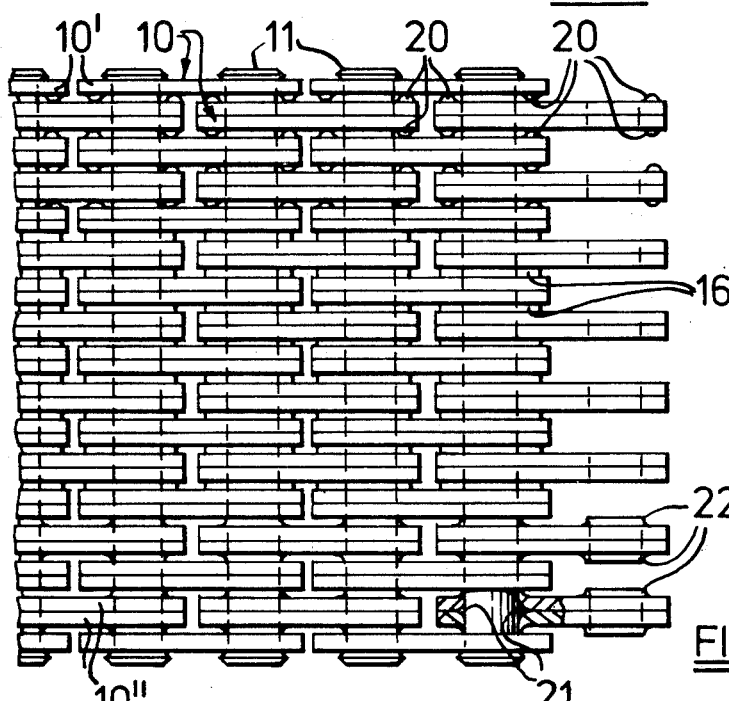

Referring to the accompanying drawings and first to FIGS. 1 and 2, the leaf chain comprises interlacing links 10 and bearing pins 11. The pins 11 pass through holes 12 in the links. The links 10 are arranged in seventeen rows the outermost of which are composed of single plates 10' disposed in line and end-to-end, and the intermediate ones of which are composed of pairs of plates 10" disposed in line and end-to-end. The pairs of plates 10" composing the intermediate rows of links are identical and do not articulate with respect to one another but act in unison as a single interlacing link 10. Each link has the same "figure-of-eight" edge configuration, and dimensions, in elevation, as shown in FIG. 1, with two holes 12 one towards each end.

For each pin 11, a washer 16 is provided on the pin between each adjacent pair of the links.

The washers have a diameter such that peripheral edge of each washer lies within the peripheral edge of its adjacent links 10.

Instead of washers 16, adjacent links 10 may be held spaced apart by bulges 20 in the pairs of plates 10" formed by indenting each one of each pair of the plates 10" on its side adjacents its companion plate of the pair. Thus the bulges 20 are formed by small, circular indentations in the plates 10" of the intermediate rows of links 10 of which one is provided towards each end of each plate such that the bulges 20 on adjacent links 10 are offset with respect to one another by 180° about a pin 11 when the chain is straight. As a further means of spacing the adjacent links, each one of each pair of plates 10" forming the first and each alternate row of intermediate links counting from each longitudinal edge of the chain may be dished, as at 21, around the holes 12 in the plate on its side adjacent its companion plate of the pair whereby a corresponding angular bulge or lip 22 is formed around the hole on the other side of the plate. The bulges or lips 22 then act to space all the adjacent links apart.

Figure 5:
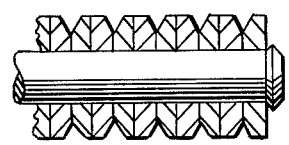
FIG. 5 is a fragmentary sectional view illustrating a modified link arrangement.

FIG. 5 shows a still further means of spacing the adjacent links. In this arrangement the outer edges of the plates 10" remote from their companion plates may be chamfered, an angle of 45° being suitable. Such chamfering may be confined to one plate 10" of each pair or again it may be confined to the plates 10" of the first and each alternate row of intermediate links counting from each longitudinal edge of the chain. The plates 10' composing the outermost rows of links may be chamfered on their edges adjacent the intermediate rows of links.

Figures 3, 4:
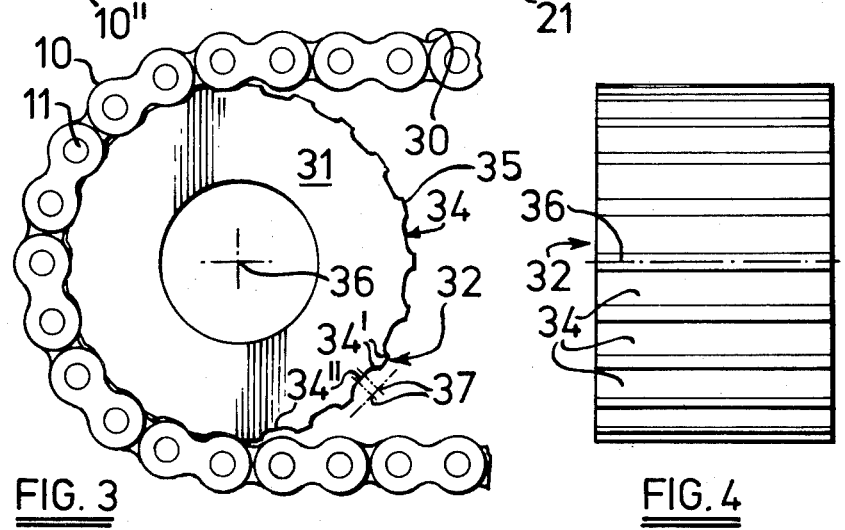
FIG. 3 is an elevation view of a limited torque, positive drive transmitting arrangement according to the present invention.
FIG. 4 is a view in the direction of arrow 4 in FIG. 3 of the drum or pulley of the positive drive transmitting arrangement shown in FIG. 3.

Referring now to FIGS. 3 and 4, a leaf chain 30 as described with reference to FIGS. 1 and 2 passes round a pulley or drum 31 which has a fluted periphery 32 comprised of flutes 34 extending straight and parallel with the rotational axis 36 of the drum. The outer surface of the pulley or drum 31 is right cylindric and the flutes 34 are, in effect, formed in this right cylindrical surface. The crest 35 of the ridges between adjacent flutes 34 are therefore part cylindrical in form and centred on the rotational axis 36. The part cylindrical crests are all of the same extent as measured in the circumferential direction of the pulley or drum. The flutes 34 are composed each by two circumferentially spaced apart cylindrical surface portions 34' each centred on an axis 37 extending parallel with the rotational axis 36, and each intersecting a crest 35, and an intermediate flat surface portion 34". All of the part cylindrical surface portions 34' are of the same radius and the radial depth of each flute, measured midway between adjacent crests is about one sixth of the width of the flute, but this is depending upon the diameter of the drum.

The "figure-of-eight" configuration of the link edges is composed of four part cylindrical surfaces of the same radius as the surface portions 34', one opposite pair of which are centred on the longitudinal axes of the adjacent bearing pins 11 respectively and the other opposite pair of which are centred on axes equidistant from, and parallel to said longitudinal axes.

The design of the pulley or drum 31 compared with the leaf chain links, is such that the peripheral edge of each of the links 10 of the chain 30 in engagement with the drum engage in adjacent flutes 34 in the drum at corresponding sides thereof as shown in FIG. 3.

Because of the shape of the pulley 31 and its interfitting co-operation with the leaf chain links, a positive drive is transmitted between the chain and the pulley so long as the chain is properly tensioned.

Chain 30 may be a length of chain anchored at each end to parts required to be moved one with respect to the other, or it may be an endless chain. In the driving arrangement, positive drive may be imparted to the chain by driving the pulley 31, and this is shown in FIG. 3 for rotation of the pulley clockwise, the links in engagement with the drum engaging in adjacent flutes at the left-hand side thereof at the top in FIG. 3. Alternatively, the chain may positively drive the pulley and this is shown for movement of the chain to the left in FIG. 3 to drive the pulley anti-clockwise the links in engagement with the drum again engaging in adjacent flutes at the left-hand side of the flutes at the top in FIG. 3.

It will be appreciated that the shape of the crests between adjacent flutes 34 is not critical. It is required only that the links remain clear of the crests as the chain passes round the pulley or drum. It is necessary nevertheless that the flutes are correctly spaced to suit the dimensions of the chain links, and in the present example, the corresponding edges of each pair of adjacent flutes 34 are spaced apart by an amount equal to the spacing of the longitudinal axes of each adjacent pair of the bearing pins 11 of the leaf chain.

The radius of the pulley or drum 31 may be varied within quite wide limits, along with the number of flutes 34 employed around the drum periphery. There is obviously a lower limit to the number of flutes as described which will meet the requirements described using leaf chain having the configuration of links described, and preferably not less than 10 flutes would be provided on the pulley or drum.

It will be understood that the fluted pulley or drum has a lengthwise extent greater than the width of the leaf chain employed with the pulley or drum and all the bearing pins of the leaf chain extend parallel with one another.

Since the leaf chain links interfit only with the flutes 34 at their edges and the crests between the flutes remain clear of the link edges, torque transmission between the chain and the pulley is limited and slipping will occur if the torque rises beyond a predetermined amount depending upon the tension in the chain. On over-load therefore damage to the chain and/or the drum cannot occur.

The spacing maintained between each pair of adjacent links 10 ensures that when the edges of the links come under substantial loads in positive drive transmitting engagement with the flutes of the drum or pulley, any damage to the link edges in the form of spreading or burrs cannot interfere with the proper articulation of the links passing round the drum or pulley.

The spacing of adjacent links also ensures that friction between the links is reduced.

Where bulges are used instead of washers to space apart the adjacent links, the passage of lubricant down between the links to the bearing pins is eased.

By maximizing the diameter of the drum or pulley 31, the permitted height of the crests 35 above the floors 34" of the flutes is increased together with the ability of the pulley to tolerate chain wear.

While a form has been described for the chain plates 10' and 10" in which the plate form radii at the two ends of each plate respectively, are struck from the centre of the pin hole 12 in each case, other plate forms for leaf chain are known and may be employed, the flute surface portions 34' being correspondingly shaped.

Instead of providing flutes 34 of the shape described, the flutes 34 may be of part cylindrical form of a radius somewhat larger that the plate form radii at the two ends of each plate 10', 10" respectively.

I claim:

1. A limited torque, positive drive transmitting arrangement comprising:

a rotatable drum having a fluted periphery, said drum being rotatable in at least one of opposite directions about an axis of rotation;

a leaf chain passing over or around the drum;

the drum having a fluted periphery comprised of substantially equispaced and substantially equidimensioned flutes extending parallel with one another and in parallel with the axis of rotation of the drum for the full width of the leaf chain, and ridges interspaced between the flutes, the ridges being of flattened shape, each of said flutes having respective side edges at respective sides thereof and having respective bottoms;

the leaf chain being comprised of interlacing links, and bearing pins interconnecting the links, the links each having at least one side member, said side members each having peripheral edges, respective ends and respective opposite sides, said bearing pins interconnecting said links such that portions of the sides of the side members of the adjacent links are adjacent each other, the peripheral edges of each of said side members being of identical figure-of-eight configuration having first and second convexly rounded link end portions respectively on each end of each link and concavely rounded indentations on opposite peripheral edge portions of said side members between said convexly rounded link end portions to form respective oppositely disposed intermediate link waist portions on each of said side members between said link end portions thereof, spacing means disposed between the adjacent sides of the side members of each adjacent pair of leaf chain links for maintaining the peripheral outermost edges of each adjacent pair of leaf chain links in spaced apart relationship, the convexly rounded link end portions engaging in the bottoms of the flutes and the concavely rounded link waist portions remaining out of contact with said ridges during passage of the chain over or around the drum; and each of said flutes having a surface portion of concavely curved shape adjacent each of its side edges, corresponding side edge portions of the flutes at one side thereof interengaging with the first convexly rounded peripheral edge portions of all the leaf chain links for drive transmission in one direction of rotation and corresponding side edge portions of the flutes at the other side thereof interengaging with the second convexly rounded peripheral edge portions of all the leaf chain links for drive transmission in the opposition direction of rotation.

2. A limited torque, positive drive transmitting arrangement as claimed in claim 1 in which the edges of a side member of at least one link are chamfered such that a portion of the adjacent sides of adjacent links, but not the peripheral outermost edges, of each of said adjacent links inwardly of said chamfers abut, portions of the sides of said chamfered edge link comprising said spacing means.

3. A limited torque, positive drive transmitting arrangement as claimed in claim 1 in which the leaf chain is an endless chain.

4. A limited torque, positive drive transmitting arrangement as claimed in claim 1 in which the spacing means comprises spacing washers on the bearing pins.

5. A limited torque, positive drive transmitting arrangement as claimed in claim 4 in which said spacing washers are provided, for each bearing pin, one between each pair of adjacent links articulated by the pin.

6. A limited torque, positive drive transmitting arrangement as claimed in claim 1 in which at least one of the links is provided with bulges, the bulges constituting said spacing means.

7. A limited torque, positive drive transmitting arrangement as claimed in claim 6 in which:

a plurality of the links are provided with said bulges, at least some of the links comprise pairs of side members in the form of respective plates, each plate having respective ends, sides facing the companion plate of the respective pairs, and two bearing pin receiving holes receiving adjacent bearing pins respectively, which plates are substantially identical and are connected so as not to articulate with respect to one another but to act in unison as a single interlacing link, and the bulges are comprised of indentations in each one of each pair of plates on its said side facing its companion plate of the pair.

8. A limited torque, positive drive transmitting arrangement as claimed in claim 7 in which the bulges are provided one towards each end of each of said pairs of plates of said at least some of said links such that bulges on adjacent links which comprise pairs of plates are offset with respect to one another by about 180° about a bearing pin when the chain is straight.

9. A limited torque, positive drive transmitting arrangement as claimed in claim 6 in which at least some of the links comprise pairs of side members in the form of respective plates, each plate having opposite sides, one of said sides facing the companion plate of the respective pairs, and two bearing pin receiving holes, which plates are substantially identical and are connected so as not to articulate with respect to one another but to act in unison as a single interlacing link, and said bulges comprise dish-shaped portions on at least some of the plates around their holes on their said side facing their companion plates, whereby corresponding angular bulges are formed around their holes on the opposite sides of the plates.

10. A limited torque, positive drive transmitting arrangement as claimed in claim 7 in which the links are arranged in rows the outermost of which comprise links formed by single side members in the form of respective single plates and in which the links are disposed in line and end-to-end, the single plates each having two bearing pin receiving holes receiving adjacent bearing pins respectively, and the intermediate rows of links comprise links formed by pairs of side members in the form of respective plates having bulges formed by said indentations, the links of said intermediate rows being likewise disposed in line and end-to-end.

11. A limited torque, positive drive transmitting arrangement as claimed in claim 9 in which the links are arranged in an odd number of rows the outermost of which comprise links formed by single side members in the form of respective single plates having ends and in which the links are disposed in line and end-to-end, the single plates each having two bearing pin receiving holes receiving adjacent bearing pins respectively, and the intermediate rows of links comprise links including pairs of side members in the form of respective plates, each having two bearing pin receiving holes receiving adjacent bearing pins respectively, which pairs of plates are substantially identical and are connected so as not to articulate with respect to one another but to act in unison as a single interlacing link, the links of said intermediate rows being likewise disposed in line and end-to-end, the links of alternate ones of said intermediate rows including the first intermediate row adjacent one longitudinal edge of the chain comprising said pairs of plates which are dished around their holes on their side adjacent their companion plates thereby to form said corresponding angular bulges around their holes on the opposite sides of the plates.

12. A limited torque, positive drive transmitting arrangement as claimed in claim 1 in which the bearing holes each have a centre, and in which the edges of the leaf chain links present substantially equal radii at the two convexly rounded link end portions of each link respectively, each centred at the centre of a bearing hole for a bearing pin passing through the link, and said flute surface portions of each flute are part cylindrical surface portions of substantially equal radius substantially equal to said radii of said convexly rounded link end portions, and are spaced apart circumferentially of the pulley or drum.

13. A limited torque, positive drive transmitting arrangement as claimed in claim 1 in which the bearing holes each have a centre, and in which the edges of the leaf chain links present substantially equal radii at the two convexly rounded link end portions of each link respectively, each centred at the centre of a bearing, pin passing through the link, and said flute surface portions of each flute are part of a cylindrical surface of a radius somewhat larger than said radii of said convexly rounded link end portions.

14. A limited torque, positive drive transmitting arrangement comprising:

a rotatable drum having a fluted periphery, said drum being rotatable in at least one of opposite directions about an axis of rotation;

a tensioned leaf chain passing over or around the drum, the leaf chain including:
- a plurality of interlacing leaf chain links having respective peripheral edges, respective ends and respective opposite sides;
- bearing pins interconnecting the leaf chain links such that portions of sides of the adjacent links are adjacent each other; and
- spacing means disposed between the adjacent sides of each adjacent pair of the leaf chain links for maintaining the peripheral outermost edges of each adjacent pair of the leaf chain links in spaced apart relationship, said spacing means of at least one of said leaf chain links comprising bulges formed in a side of said at least one leaf chain link; and the edges of the leaf chain links all being of substantially identical figure-of-eight configuration and the flutes of the fluted periphery of the drum extending substantially straight and in parallel with the rotational axis of the drum, the flutes being all of substantially identical, uniform, cross-sectional shape and being substantially uniformly spaced, the depth, shape and spacing of the flutes being such that the peripheral edge of each of the links of the chain in engagement with the drum engages flute surface portions of adjacent flutes in the drum at corresponding sides thereof.

15. A limited torque, positive drive transmitting arrangement as claimed in claim 14 wherein a plurality of the links are provided with said bulges in their sides for maintaining the peripheral edges of the adjacent pairs of leaf chain links in spaced apart relationship.

16. A limited torque, positive drive transmitting arrangement as claimed in claim 14 in which:
- a plurality of the links are provided with said bulges in their sides,
- at least some of the links comprise pairs of plates, each plate having respective ends, sides facing the companion plate of the respective pairs, and two bearing pin receiving holes receiving adjacent bearing pins respectively, which plates are substantially identical and are connected so as not to articulate with respect to one another but to act in unison as a single interlacing link, and
- the bulges are comprised of indentations in the sides of each one of each pair of plates on its side facing its companion plate of the pair.

17. A limited torque, positive drive transmitting arrangement as claimed in claim 16 in which the links are arranged in rows, the outermost row of links being comprised of links formed by single plates and in which the links are disposed in line and end-to-end, the single plates each link having two bearing pin receiving holes for receiving adjacent bearing pins respectively, and the intermediate rows of links comprise links formed by pairs of plates having bulges formed by said indentations, the links of said intermediate rows being likewise disposed in line and end-to-end.

18. A limited torque, positive drive transmitting arrangement as claimed in claim 16 in which the bulges are provided one towards each end of each of said pairs of plates of said at least some of the links such that the bulges on adjacent links which comprise pairs of plates are offset with respect to one another by about 180° about a bearing pin when the chain is straight.

19. A limited torque, positive drive transmitting arrangement as claimed in claim 14 in which at least some of the links comprise pairs of plates, each plate having sides facing the companion plate of the respective pairs and two bearing pin receiving holes, which plates are substantially identical and are connected so as not to articulate with respect to one another but to act in unison as a single interlacing link, and said bulges comprise dish-shaped portions on at least some of the plates around their holes on their said side facing their companion plates, whereby corresponding angular bulges are formed around their holes on the opposite sides of the plates.

20. A limited torque, positive drive transmitting arrangement as claimed in claim 19 in which the links are arranged in an odd number of rows, the outermost row of links being comprising links formed by single plates and in which the links are disposed in line and end-to-end, the single plates each link having two bearing pin receiving holes for receiving adjacent bearing pins respectively, and the intermediate rows of links comprise links formed by pairs of plates each having two bearing pin receiving holes for receiving adjacent bearing pins respectively, the plates of said pairs of plates being substantially identical and being connected so as not to articulate with respect to one another but to act in unison as a single interlacing link, the links of said intermediate rows being likewise disposed in line and end-to-end, the links of alternate ones of said intermediate rows including the first intermediate row adjacent one longitudinal edge of the chain comprising said pairs of plates which are dished around their holes on their side adjacent their companion plates thereby to form the plates with said corresponding angular bulges or lips around their holes on their sides opposite the sides adjacent the respective companion plates.

21. A limited torque, positive drive transmitting arrangement as claimed in claim 14 in which the bearing holes each have a centre, and in which the edges of the leaf chain links present substantially equal radii at the two convexly rounded link end portions of each link respectively, each centred at the centre of a bearing hole for a bearing pin passing through the link, and said flute surface portions of each flute are part cylindrical surface portions of substantially equal radius substantially equal to said radii of said convexly rounded link end portions, and are spaced apart circumferentially of the pulley or drum.

22. A limited torque, positive drive transmitting arrangement as claimed in claim 14 in which the bearing holes each have a centre, and in which the edges of the leaf chain links present substantially equally radii at the two convexly rounded link end portions of each link respectively, each centred at the centre of a bearing hole for a bearing pin passing through the link and said flute surface portions of each flute are part of a cylindiical surface of a radius somewhat larger than said radii of said convexly rounded link end portions.

23. A limited torque, positive drive transmitting arrangement as claimed in claim 14 in which the leaf chain is an endless chain.

24. A leaf chain comprising:
- interlacing links, each link having peripheral edges, respective ends and respective opposite sides;
- bearing pins interconnecting the links at portions proximate the ends of the links such that portions of the sides of the adjacent links are adjacent each other; and spacing means disposed between the adjacent sides of each adjacent pin of leaf chain links for maintaining the peripheral edges of each adjacent pair of the leaf chain links in spaced apart relationship;

the spacing means of at least one of the links including spacing bulges formed in the at least one link on the side thereof facing the link adjacent thereto.

25. A leaf chain according to claim 24 in which a plurality of said links have said spacing bulges on respective sides thereof.

* * * * *